(12) United States Patent
Sekine et al.

(10) Patent No.: US 11,649,166 B2
(45) Date of Patent: May 16, 2023

(54) PROCESS FOR PRODUCING CARBONATE APATITE

(71) Applicant: JAPAN ATOMIC ENERGY AGENCY, Ibaraki (JP)

(72) Inventors: Yurina Sekine, Ibaraki (JP); Takuya Nankawa, Ibaraki (JP); Naofumi Kozai, Ibaraki (JP)

(73) Assignee: JAPAN ATOMIC ENERGY AGENCY, Ibaraki (JP)

( * ) Notice: Subject to any disclaimer, the term of this patent is extended or adjusted under 35 U.S.C. 154(b) by 464 days.

(21) Appl. No.: 16/732,396

(22) Filed: Jan. 2, 2020

(65) Prior Publication Data

US 2020/0216318 A1 Jul. 9, 2020

(30) Foreign Application Priority Data

Jan. 9, 2019 (JP) .............................. JP2019-002111

(51) Int. Cl.
  *C01B 25/16* (2006.01)
(52) U.S. Cl.
  CPC ................................. *C01B 25/16* (2013.01)
(58) Field of Classification Search
  CPC ..... C01B 25/16; C01B 25/32; C01P 2002/60; C01P 2002/72; C01P 2004/04
  See application file for complete search history.

(56) References Cited

U.S. PATENT DOCUMENTS

| 4,917,702 | A | | 4/1990 | Scheicher et al. | |
| 5,047,255 | A | * | 9/1991 | Fujita | C02F 1/52 |
| | | | | | 426/324 |
| 5,254,285 | A | * | 10/1993 | Fujita | B01J 20/20 |
| | | | | | 252/178 |
| 2005/0027033 | A1 | * | 2/2005 | Knaack | C08G 18/3882 |
| | | | | | 606/77 |
| 2005/0266037 | A1 | | 12/2005 | Mao et al. | |
| 2013/0084228 | A1 | | 4/2013 | Li et al. | |
| 2021/0106719 | A1 | * | 4/2021 | Xia | B33Y 70/10 |

FOREIGN PATENT DOCUMENTS

| CN | 105776371 A | * | 7/2016 |
| CN | 108529580 | | 9/2018 |
| DE | 28 40 064 | | 3/1980 |
| JP | 62-500153 | | 1/1987 |
| JP | 2008-500094 | | 1/2008 |
| JP | 2010-90014 | | 4/2010 |

OTHER PUBLICATIONS

Office Action dated Sep. 5, 2022 in Chinese Patent Application No. 202010018637.9, with English-language translation.
Zhu Qingxia et al, China Ceramics, Dec. 2005, vol. 41, No. 6, pp. 6-10, with English abstract.
Office Action dated Nov. 8, 2022 in Japanese Patent Application No. 2019-002111, with English-language translation.

* cited by examiner

*Primary Examiner* — Anthony J Zimmer

(74) *Attorney, Agent, or Firm* — Wenderoth, Lind & Ponack, L.L.P.

(57) ABSTRACT

An efficient method of producing a carbonate apatite is provided. The method comprises: a first step of calcining animal bone; and a second step of reacting a bone calcined product obtained in the first step with a basic carbonate compound.

7 Claims, 5 Drawing Sheets

PROCESS FOR PRODUCING CARBONATE APATITE

BACKGROUND OF THE INVENTION

Field of the Invention

The present invention relates to a production technology for carbonate apatite.

Description of the Related Art

Since apatite compounds have good affinity for living organisms, there have been a large number of studies on their synthesis methods and physical properties aiming at their utilization as materials of artificial bones, drug delivery carriers, and the like, and as metal adsorbents. Since apatite compounds are usually synthesized using $CaHPO_4 \cdot 2H_2$ and $CaCO_3$ as raw materials and performing sintering at not less than 500° C., they have had a problem in the cost for application as metal adsorbents and the like which are required to be inexpensively provided.

Patent Document 1 discloses a method of producing a hydroxyapatite powder using apatite particles obtained by calcination of natural bone. However, no efficient method has been known for obtaining carbonate apatite from a natural material such as bone.

PRIOR ART DOCUMENT

Patent Document

[Patent Document 1] JP 5486790 B

SUMMARY OF THE INVENTION

One aspect of the present invention is to provide an efficient method of producing a carbonate apatite.

The present inventors developed an inexpensive and simple production method of a carbonate apatite with high carbonate introduction efficiency by using, as a raw material, livestock bone which is usually discarded as a waste material, and calcining the bone at high pressure followed by reacting the bone with a basic carbonate compound.

The present invention provides the followings.

[1] A method of producing a carbonate apatite, comprising:
    a first step of calcining animal bone; and
    a second step of reacting a bone calcined product obtained in the first step with a basic carbonate compound.

[2] The method according to [1], wherein the animal bone is pig bone, bird bone, or cow bone.

[3] The method according to [1] or [2], wherein the calcination in the first step is carried out at a pressure of atmospheric pressure to 3 atm at a temperature of 100 to 200° C.

[4] The method according to any one of [1] to [3], wherein, in the second step, the basic carbonate compound is added in an amount of 1 wt % to 50 wt % with respect to the weight of the bone calcined product.

[5] The method according to any one of [1] to [4], wherein the reaction with the basic carbonate compound in the second step is carried out at a temperature of 30 to 90° C.

[6] The method according to any one of [1] to [5], wherein the basic carbonic acid salt is one or more selected from the group consisting of $NaHCO_3$, $Na_2CO_3$, $K_2CO_3$, $KHCO_3$, $CaCO_3$, $MgCO_3$, $Li_2CO_3$, and $(NH_4)_2CO_3$.

[7] The method according to any one of [1] to [6], further comprising a third step of drying a bone treated product obtained in the second step.

[8] The method according to any one of [1] to [7], further comprising a step of pulverizing the bone.

According to the present invention, a carbonate apatite can be efficiently produced by a mild and simple process using livestock bone or the like as a raw material. Since the carbonate apatite compound obtained by the production method of the present invention has a high carbonate-group introduction rate, the compound can be suitably used for uses including adsorption and removal of heavy metals such as radioactive strontium, and as a material of artificial bones, drug delivery carriers, and the like.

DETAILED DESCRIPTION OF THE INVENTION

Figure 1:
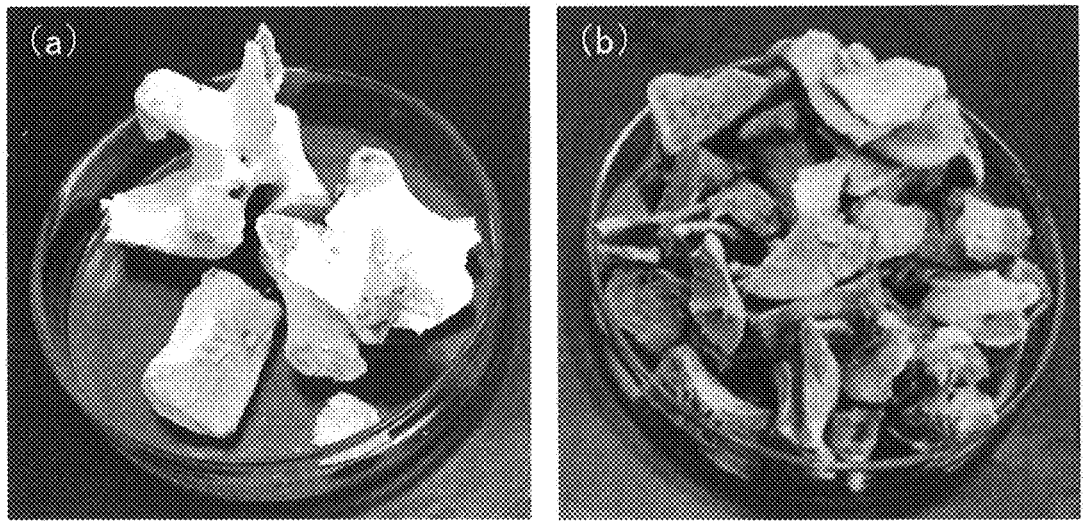
FIG. 1 shows photographs of bone samples before (a) and after (b) basic carbonate compound treatment.

The method of producing a carbonate apatite of the present invention comprises:
    a first step of calcining animal bone; and
    a second step of reacting a bone calcined product obtained in the first step with a basic carbonate compound.

First Step

Examples of the animal bone include mammalian bones and fish bones. The animal bone is preferably livestock bone. For example, pig bone, bird bone, cow bone, or the like may be used.

The calcination conditions are preferably those under which water can be removed from the bone. For example, the temperature condition is preferably within the range of 100 to 200° C., more preferably 120 to 150° C. The pressure is preferably within the range of atmospheric pressure to 3 atm, more preferably 1.5 atm to 2.5 atm, especially preferably about 2 atm. The calcination time is not limited, and may be appropriately controlled according to the treated amount and/or the like. The calcination time is, for example, 0.5 to 5 hours. Since bone marrow is detached from the bone by this calcination step, the bone marrow can be easily manually removed. Thus, the first step is preferably followed by removal of the bone marrow before carrying out the second step.

Second Step

In the $2^{nd}$ Step, a basic carbonate compound is reacted with the bone calcined product obtained in the first step, to introduce carbonate groups into an apatite compound contained in the bone calcined product. In other words, part of the phosphate groups and/or hydroxyl groups contained in the apatite compound are substituted with carbonate groups. Further, the reaction with the basic carbonate compound is also effective for efficient removal of organic matter remaining in the bone.

The basic carbonate compound that may be used herein is not limited as long as it exhibits basicity and is capable of introducing carbonate groups to the apatite compound. Examples of the basic carbonate compound include $NaHCO_3$, $Na_2CO_3$, $K_2CO_3$, $KHCO_3$, $CaCO_3$, $MgCO_3$, $Li_2CO_3$, and $(NH_4)_2CO_3$. $NaHCO_3$ is especially preferred.

In the reaction, the bone calcined product and the basic carbonate compound may be added to a liquid such as water, and, if necessary, the resulting mixture may be stirred, to react these with each other. The amount of the basic carbonate compound added is preferably within the range of 1 wt % to 50 wt %, more preferably 10 to 50 wt %, with respect to the weight of the bone calcined product. The reaction time is preferably 3 to 72 hours, more preferably 10 to 72 hours. The reaction temperature is preferably within the range of 30 to 90° C., more preferably 40 to 60° C.

The carbonate-group introduction rate to the apatite compound can be controlled by adjusting the concentration of the basic carbonate compound added, and/or the reaction time. By increasing the carbonate-group introduction rate, an improved function as a metal adsorbent material can be obtained.

Drying Step

After the second step, it is preferred to carry out a step of drying the bone sample obtained. The drying method is not limited, and the sample may be dried by sun drying or using a drier. The drying time is also not limited as long as it is sufficient for removal of water, and may be appropriately set according to the amount of the sample and the drying conditions.

Pulverization (Microparticulation) Step

Although the carbonate apatite compound obtained by the method of the present invention may be used as it is in a bulk state (with a size of, for example, about 5 to 10 cm), it may be pulverized depending on the use. The pulverization may be carried out using known means. By the pulverization, a powder having a particle size of several ten to several hundred micrometers can be prepared.

Carbonate Apatite Compound

The carbonate apatite compound obtained by the method of the present invention is characterized in that it contains as major components calcium, carbonate groups, phosphate groups, and hydroxyl groups, and has a high carbonate-group introduction rate. The carbonate-group introduction rate is not limited as long as the compound can be obtained by the method of the present invention. The carbonate-group introduction rate is preferably not less than 15.0% by weight, more preferably not less than 15.4% by weight, still more preferably not less than 15.6% by weight, especially preferably not less than 16.0% by weight. The Ca/P molar ratio is, for example, not less than 1.5. The content of carbonate groups can be quantified by comparing the absorption intensity of the absorption band of carbonate groups that appears at 1400 to 1550 $cm^{-1}$ in the infrared absorption spectrum, with that of a carbonate-containing calcium phosphate having a known carbonate content.

The carbonate apatite compound obtained by the method of the present invention may contain a metal other than Ca, such as copper (Cu), zinc (Zn), strontium (Sr), magnesium (Mg), potassium (K), iron (Fe), or sodium (Na).

The carbonate apatite compound obtained by the method of the present invention may be a compound containing a crystal structure. In such a case, regarding the size of the crystallites as the minimum units constituting the crystal, the crystal obtained may have an average crystallite size of about 1 to 100 nm, which is smaller than conventional sizes.

EXAMPLES

The present invention is described below more concretely by way of Examples. However, modes of the present invention are not limited to the following Examples.

Example 1

Preparation of Materials and Evaluation of Physical Properties

Figure 2:
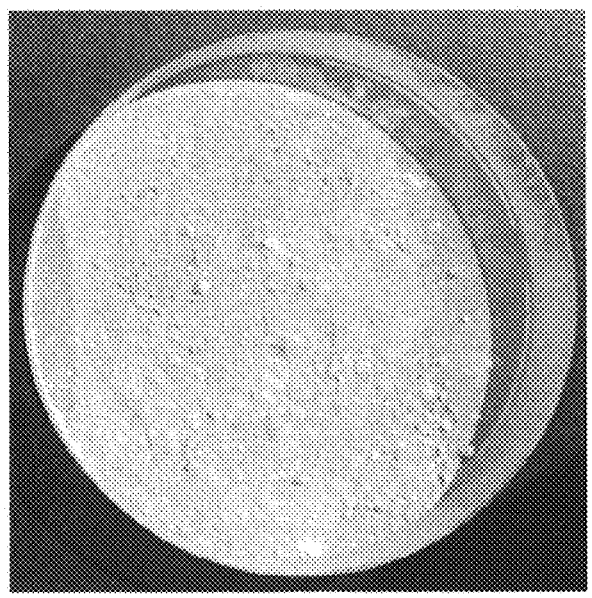
FIG. 2 shows a photograph of a bone sample powder obtained by basic carbonate compound treatment and drying treatment followed by pulverization.

Pig bone was heated at 130° C. at 2 atm for 3 hours. Detached bone marrow was removed ($1^{st}$ Step). Thereafter, 5 g (Sample 1), 0.5 g (Sample 2), 0.05 g (Sample 3), or 0.025 g (Sample 4) of $NaHCO_3$ was added to 2.5 g of the sample in 50 mL of pure water, and each resulting mixture was heated at 45° C. at atmospheric pressure for 48 hours ($2^{nd}$ Step). Thereafter, each mixture was washed with water, and then dried at 60° C. for 2 hours (FIG. 1). This sample was pulverized into a powder form (FIG. 2). The resulting powder was provided as a material according to the present invention, and subjected to the following evaluation. For comparison, a sample prepared by carrying out only $1^{st}$ Step followed by drying and pulverization (Sample α), and a commercially available hydroxyapatite were used.

Figure 3:
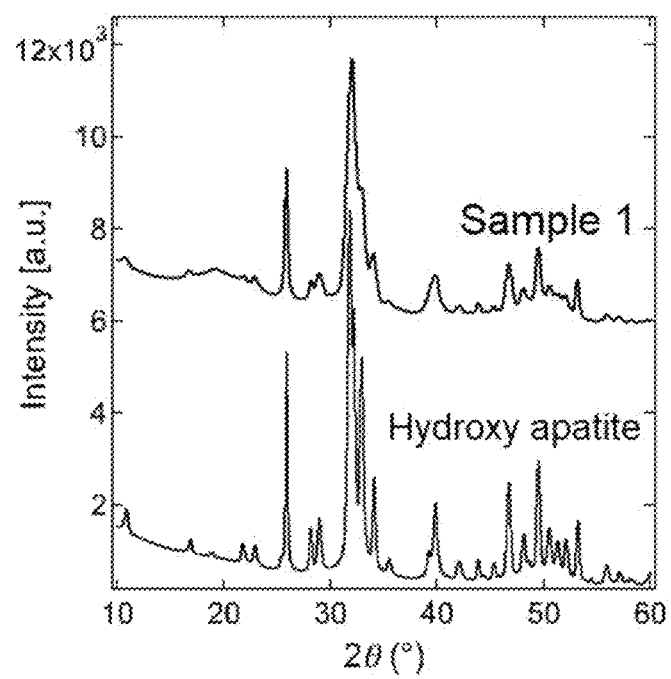
FIG. 3 shows an X-ray diffraction (XRD) pattern of a bone sample powder.
Figure 4:
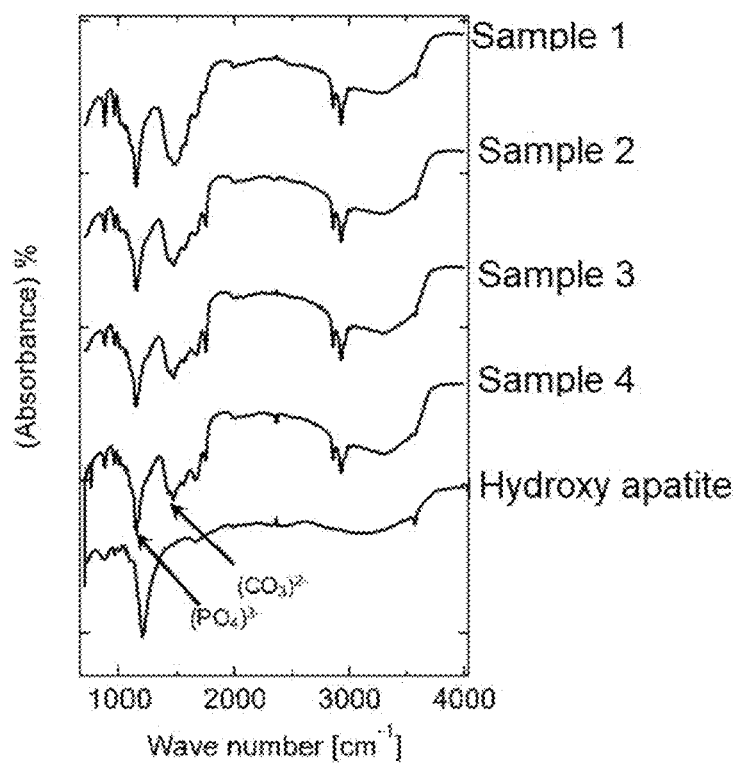
FIG. 4 shows infrared absorption (IR) spectra of bone sample powders.
Figure 5:
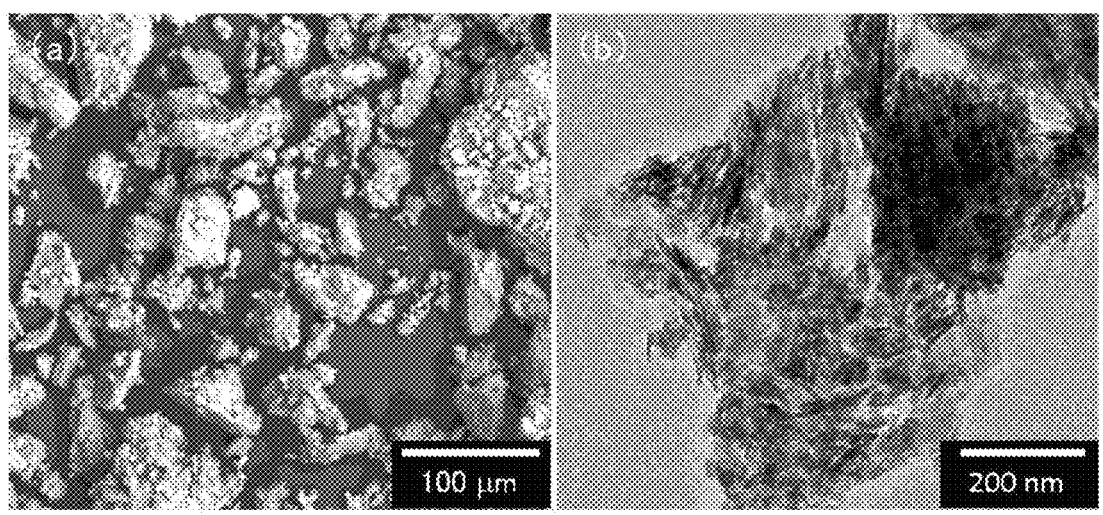
FIG. 5 shows photographs showing a scanning electron micrograph (SEM) (a) and a transmission electron micrograph (TEM) (b) of a bone sample powder.

By powder X-ray diffraction analysis, it was confirmed that the materials according to the present invention have a hexagonal ($P6_3/m$) crystal structure similarly to the commercially available hydroxyapatite compound (FIG. 3). Since a broad background appears due to an amorphous structure, the materials were found to have low crystallinity. According to results of measurement of the absorption spectrum by infrared absorption spectroscopy, the materials according to the present invention were found to contain a carbonate group, a phosphate group, and a hydroxyl group (FIG. 4). Further, according to X-ray fluorescence analysis, the materials were found to contain copper (Cu), zinc (Zn), strontium (Sr), magnesium (Mg), potassium (K), iron (Fe), and sodium (Na), as well as calcium (Ca) as the major component (Table 1). From these results, it was shown that the materials according to the present invention are carbonate apatite containing metal ions. Using a scanning electron microscope (SEM) and a transmission electron microscope (TEM), the materials according to the present invention were observed (FIG. 5). As a result, the crystallites were found to have sizes with a width of 5 to 12 nm, and a length of 20 to 85 nm.

TABLE 1

| Metal species contained | |
| --- | --- |
| Element species | Content ratio (%) |
| Ca | 93.48 |
| Cu | 1.98 |
| Zn | 1.64 |
| Sr | 1.31 |
| K | 0.63 |
| Fe | 0.57 |
| Na | 0.31 |
| Mg | 0.08 |

Figure 6:
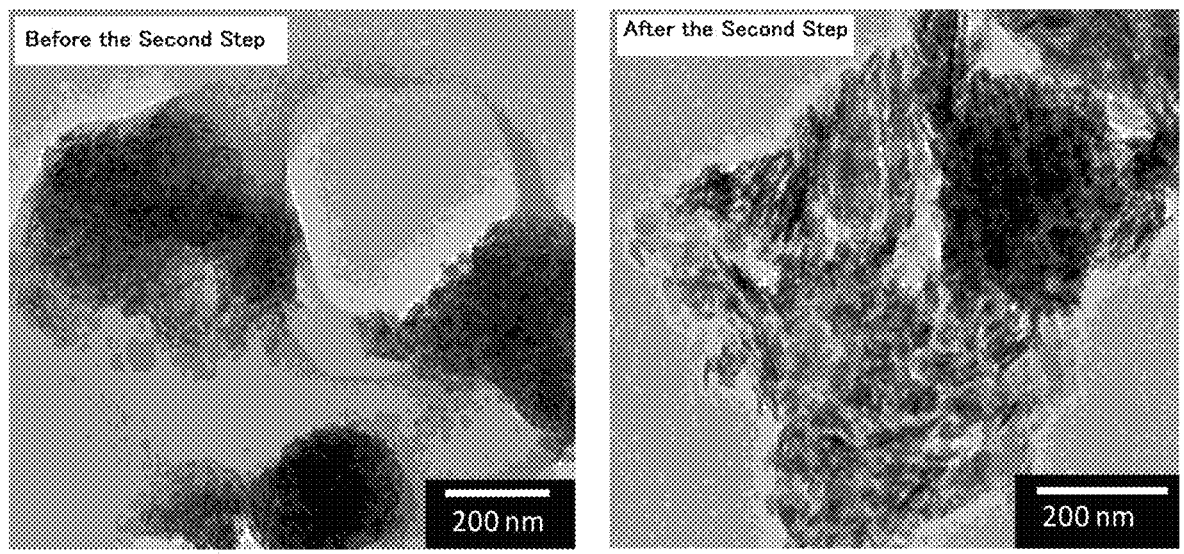
FIG. 6 shows photographs showing TEM images of bone sample powders obtained with basic carbonate compound treatment or without basic carbonate compound treatment.

First, Sample α, to which no $NaHCO_3$ was added, was observed by transmission electron microscopy (FIG. 6). Unlike the cases where $NaHCO_3$ was added, crystallites showed aggregation, and they were found to be covered with thin films. The thin films are thought to be organic matter that was components of the bone. Thus, it was shown that, as the amount of $NaHCO_3$ added increases, the removal rate of organic matter increases.

Figure 7:
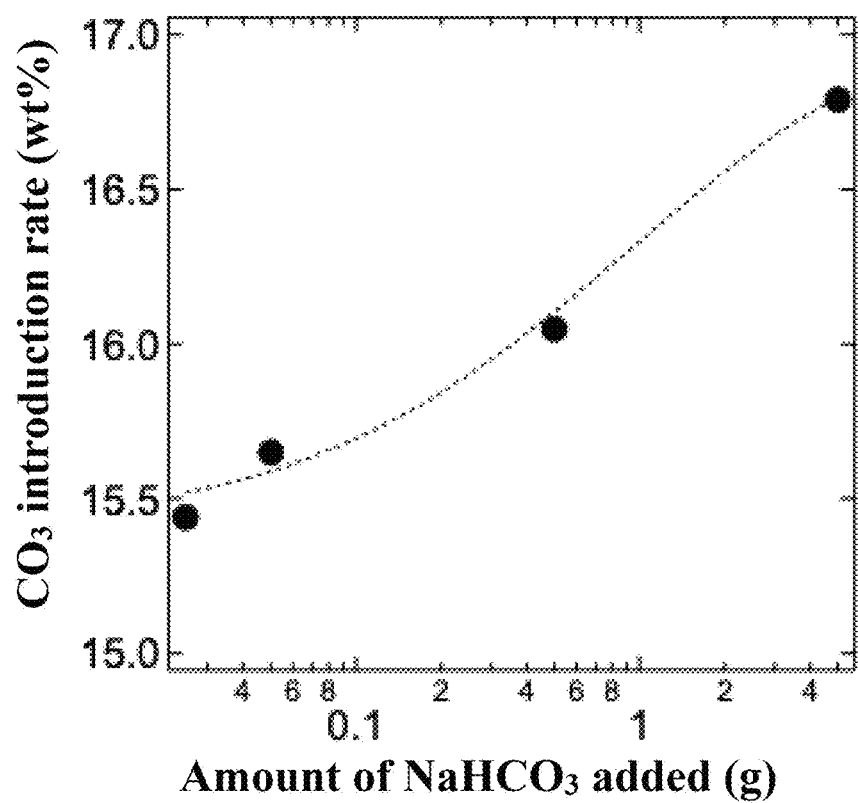
FIG. 7 shows a graph showing the relationship between the amount of sodium hydrogen carbonate added and the carbonate-group introduction rate.

The carbonate/phosphate intensity ratio was calculated from the absorption spectrum, and the amount of carbonate introduced was calculated from the peak ratio. According to a method reported in a known patent (calcium phosphate microparticles, JP 2005-126335 A), mass spectrometry of a known carbonate-containing artificial apatite (Sigma) was carried out. Based on the result, the correlation coefficient between the peak ratio and the amount of carbonate was determined for calculation. The results are shown in Table 2 and FIG. 7. As the amount of $NaHCO_3$ added increased, the carbonate-group introduction rate increased. The samples showed extremely high carbonate introduction rates that could not be achieved by known production methods. This may be due to, for example, the fact that the contact area of the bone-derived apatite with the carbonate increased as a result of the removal of organic matter by the alkali metal, which happened at the same time as the introduction of carbonate. Each site occupied by the carbonate is thought to be any of a phosphate site, hydroxyl site, non-apatitic site, or surface adsorption site.

TABLE 2

| Chemical composition | | |
| --- | --- | --- |
| Sample | Carbonate introduction rate (wt %) | Ca/P |
| 1 | 16.79 | 1.75 |
| 2 | 16.05 | 1.69 |
| 3 | 15.65 | 1.58 |
| 4 | 15.44 | — |
| α | 15.40 | — |

Each sample was subjected to zeta potential measurement. The results are shown in Table 3. The zeta potential exhibited negative values as the carbonate-group introduction rate increased. This is due to slight changes in the composition and the crystal structure that occurred as a result of the introduction of carbonate groups. The negative charge is also a useful property for adsorption of cationic hazardous metals.

TABLE 3

| Zeta potentials of Samples Zeta potentials (mV) | | | | |
| --- | --- | --- | --- | --- |
| Sample 1 | Sample 2 | Sample 3 | Sample α | Hydroxyapatite |
| −46.2 | −32.1 | −15.8 | −14.7 | −5.5 |

From these results, it was discovered that a material having high adsorption capacity for metal ions can be synthesized by increasing the amount of $NaHCO_3$ added, because of contribution of the following two factors: (1) efficient removal of organic matter from the bone, and (2) formation of stable adsorption sites by the introduction of carbonate groups.

Example 2

Preparation of Materials and Evaluation of Physical Properties

Introduction of carbonate using various carbonic acid salts was evaluated. Pig bone was heated at 130° C. at 2 atm for 3 hours. Detached bone marrow was removed (1$^{st}$ Step). Thereafter, 5 g of ammonium carbonate $((NH_4)_2CO_3)$, sodium carbonate $(Na_2CO_3)$, or potassium hydrogen carbonate $(KHCO_3)$ was added to 2.5 g of the sample and 50 mL of pure water, and the resulting mixture was heated at 45° C. at atmospheric pressure for 48 hours (2$^{nd}$ Step). Thereafter, each mixture was washed with water, and then dried at 60° C. for 2 hours. This sample was pulverized into a powder form.

Figure 8:
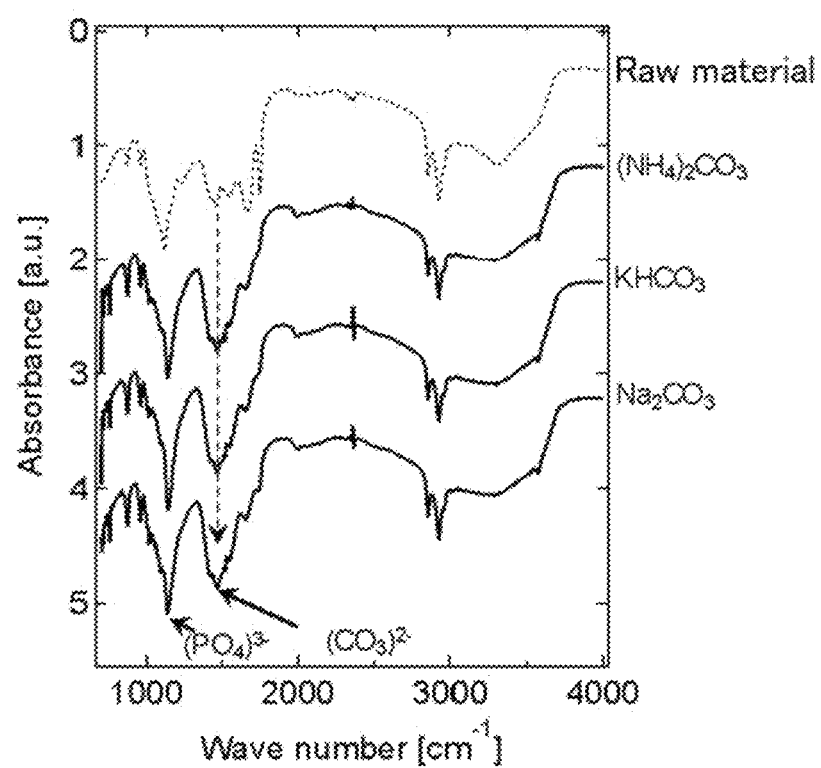
FIG. 8 is a graph showing carbonate group-introducing effects obtained with various carbonic acid salts.

According to results of measurement of the absorption spectrum by infrared absorption spectroscopy, the samples prepared with each carbonic acid salt showed increases in the intensity of the carbonate group peak, indicating successful introduction of carbonate (FIG. 8).

What is claimed is:

1. A method of producing a carbonate apatite, comprising:
   a first step of calcining animal bone followed by removal of a bone marrow; and
   a second step of reacting a bone calcined product obtained in the first step with a basic carbonate compound,
   wherein the basic carbonate compound is a compound having a pH that exceeds 7 in water, and
   wherein the basic carbonate compound is added in an amount of 10 wt % to 50 wt % with respect to the weight of the bone calcined product.

2. The method according to claim 1, wherein the animal bone is pig bone, bird bone, or cow bone.

3. The method according to claim 1, wherein the calcination in the first step is carried out at a pressure of atmospheric pressure to 3 atm at a temperature of 100 to 200° C.

4. The method according to claim 1, wherein the reaction with the basic carbonate compound in the second step is carried out at a temperature of 30 to 90° C.

5. The method according to claim 1, wherein the basic carbonate compound is one or more selected from the group consisting of $NaHCO_3$, $Na_2CO_3$, $K_2CO_3$, $KHCO_3$, $CaCO_3$, $MgCO_3$, $Li_2CO_3$, and $(NH_4)_2CO_3$.

6. The method according to claim 1, further comprising a third step of drying a bone treated product obtained in the second step.

7. The method according to claim 1, further comprising a step of pulverizing the bone.

\* \* \* \* \*